(12) United States Patent
Yang et al.

(10) Patent No.: US 11,754,868 B2
(45) Date of Patent: Sep. 12, 2023

(54) LIQUID CRYSTAL DISPLAY PANEL AND LIQUID CRYSTAL DISPLAY DEVICE

(71) Applicant: WUHAN CHINA STAR OPTOELECTRONICS TECHNOLOGY CO., LTD, Wuhan (CN)

(72) Inventors: Huanli Yang, Wuhan (CN); Guowei Zha, Wuhan (CN)

(*) Notice: Subject to any disclaimer, the term of this patent is extended or adjusted under 35 U.S.C. 154(b) by 530 days.

(21) Appl. No.: 16/970,961

(22) PCT Filed: Jul. 30, 2020

(86) PCT No.: PCT/CN2020/105803
§ 371 (c)(1),
(2) Date: Aug. 19, 2020

(87) PCT Pub. No.: WO2022/007060
PCT Pub. Date: Jan. 13, 2022

(65) Prior Publication Data
US 2023/0132086 A1    Apr. 27, 2023

(30) Foreign Application Priority Data
Jul. 9, 2020   (CN) .......................... 202010654544.5

(51) Int. Cl.
*G02F 1/1333* (2006.01)
*G06V 40/13* (2022.01)
*G02F 1/1335* (2006.01)

(52) U.S. Cl.
CPC .... *G02F 1/13338* (2013.01); *G02F 1/133331* (2021.01); *G02F 1/133357* (2021.01);
(Continued)

(58) Field of Classification Search
CPC .......... G02F 1/13338; G02F 1/133357; G02F 1/133512; G02F 1/133514; G02F 1/133526
See application file for complete search history.

(56) References Cited

U.S. PATENT DOCUMENTS 10,914,977 B1 * 2/2021 Hsu ...................... G02F 1/13338
2009/0115713 A1 * 5/2009 Kakinuma ........... G09G 3/3426
345/88
(Continued)

FOREIGN PATENT DOCUMENTS

CN    209373637 U    9/2019
CN    110308583 A  * 10/2019 ......... G02F 1/13338
(Continued)

OTHER PUBLICATIONS

English translation for CN-110308583-A, Su (Year: 2019).*

*Primary Examiner* — Jonathan Y Jung (57) ABSTRACT

A liquid crystal display panel is provided. A micro-lens array, a black matrix layer array, and a detector array are sequentially disposed between a cover plate and an array substrate, and a combination of the micro-lens array and the black matrix layer array filters out more interference light, so that most of light entering the detector array is fingerprint reflected light, which improves an accuracy of fingerprint recognition. A liquid crystal display device having the liquid crystal display panel is also provided.

20 Claims, 2 Drawing Sheets

(52) U.S. Cl.
CPC .. *G02F 1/133512* (2013.01); *G02F 1/133514* (2013.01); *G02F 1/133526* (2013.01); *G06V 40/1318* (2022.01)

(56) References Cited

U.S. PATENT DOCUMENTS

| | | | |
|---|---|---|---|
| 2016/0049436 A1* | 2/2016 | Lin | H01L 27/14618 257/432 |
| 2019/0228203 A1 | 7/2019 | Kim et al. | |
| 2020/0285345 A1* | 9/2020 | Xiang | G06F 3/0421 |
| 2022/0004734 A1* | 1/2022 | Chen | G06V 40/1318 |

FOREIGN PATENT DOCUMENTS

| | | |
|---|---|---|
| CN | 110928017 A | 3/2020 |
| CN | 111160325 A | 5/2020 |
| CN | 111291719 A | 6/2020 |
| CN | 210721511 U | 6/2020 |
| EP | 3514727 A2 | 7/2019 |

\* cited by examiner

LIQUID CRYSTAL DISPLAY PANEL AND LIQUID CRYSTAL DISPLAY DEVICE

FIELD OF DISCLOSURE

The present disclosure relates to the field of display technologies, and more particularly to a liquid crystal display panel and a liquid crystal display device.

BACKGROUND

A liquid crystal display panel has a layered structure including a cover glass, photoresists, a color-filter-substrate-side polarizer, a color filter substrate, a liquid crystal layer, a thin film transistor array substrate, and a thin film transistor array-substrate-side polarizer, which are arranged sequentially from top to bottom. There are usually two types of fingerprint recognition technologies applied to liquid crystal display panels, including an under-screen fingerprint recognition technology and an in-screen fingerprint recognition technology. The in-screen fingerprint recognition technology has gradually become a future development trend because it can further reduce a size of the liquid crystal display. However, a current in-screen fingerprint recognition technology obtains too many interference signals while obtaining effective fingerprint signals, resulting in low fingerprint recognition accuracy.

SUMMARY OF DISCLOSURE

The present disclosure provides a liquid crystal display panel and a liquid crystal display device, to solve a technical problem of low accuracy of fingerprint recognition due to a fact that an existing in-screen fingerprint recognition technology obtains too many interference signals while obtaining effective fingerprint signals.

In a first aspect, the present disclosure provides a liquid crystal display panel. The liquid crystal display panel includes a color filter substrate, an array substrate opposite to the color filter substrate, and a cover plate disposed over a side of the color filter substrate away from the array substrate. The color filter substrate includes a substrate and a color resist layer disposed over a side of the substrate close to the array substrate.

The liquid crystal display panel further includes a black matrix layer array, a micro-lens array, and a detector array. The black matrix layer array is disposed between the cover plate and the array substrate, the black matrix layer array includes a plurality of black matrix layers which are disposed one above another, a projection of each of the black matrix layers on the array substrate and a projection of the color resist layer on the array substrate do not overlap with each other, the black matrix layer array is provided with a plurality of through hole groups, and each of the through hole groups includes a plurality of through holes which are arranged correspondingly with respect to one another, and the plurality of through holes are correspondingly disposed in the plurality of black matrix layers.

The micro-lens array is disposed between the cover plate and the black matrix layer array. The micro-lens array includes a plurality of micro-lens units, and each of the micro-lens units corresponds to one of the through hole groups.

The detector array is disposed between the black matrix layer array and the array substrate. The detector array includes a plurality of detector units, and each of the detector units corresponds to one of the through hole groups.

In some embodiments, the micro-lens array is disposed on a surface of the substrate close to the array substrate.

In some embodiments, one of the black matrix layers and the color resist layer are arranged in a same layer.

In some embodiments, in addition to the one of the black matrix layers arranged in the same layer as the color resist layer, another black matrix layer is disposed between the micro-lens array and the color resist layer.

In some embodiments, the detector array is disposed on a surface of the array substrate close to the color filter substrate.

In some embodiments, the black matrix layer array includes two black matrix layers, the two black matrix layers are a first black matrix layer and a second black matrix layer, the second black matrix layer and the color resist layer are arranged in the same layer, and the liquid crystal display panel further includes a first planarization layer and a second planarization layer.

The first planarization layer is disposed on the surface of the substrate close to the array substrate and covers the micro-lens array, and the first black matrix layer is disposed on a surface of the first planarization layer close to the array substrate.

The second planarization layer is disposed on a surface of the first black matrix layer close to the array substrate, and the second black matrix layer and the color resist layer are disposed on a surface of the second planarization layer close to the array substrate.

In some embodiments, a thickness of the first planarization layer and a thickness of the second planarization layer range from 2 μm to 50 μm, and a distance between the second planarization layer and the detector array ranges from 3 μm to 15 μm.

In some embodiments, a diameter of any one of the through holes in the first black matrix layer ranges from 8 μm to 28 μm, and a diameter of any one of the through holes in the second black matrix layer ranges from 3 μm to 16 μm.

In some embodiments, the micro-lens units include a plurality of micro lenses, a diameter of any one of the micro lenses ranges from 3 μm to 30 μm, a height of any one of the micro lenses ranges from 2 μm to 10 μm, and a radius of curvature of any one of the micro lenses ranges from 5 μm to 15 μm.

In some embodiments, a shape of the detector units includes square or round, and a side length of a square detector unit or a diameter of a round detector unit both range from 5 μm to 18 μm.

In s second aspect, the present disclosure provides a liquid crystal display device. The liquid crystal display device includes a liquid crystal display panel. The liquid crystal display panel includes a color filter substrate, an array substrate opposite to the color filter substrate, and a cover plate disposed over a side of the color filter substrate away from the array substrate. The color filter substrate includes a substrate and a color resist layer disposed over a side of the substrate close to the array substrate. The liquid crystal display panel further includes a black matrix layer array, a micro-lens array, and a detector array.

The black matrix layer array is disposed between the cover plate and the array substrate, the black matrix layer array includes a plurality of black matrix layers which are disposed one above another, a projection of each of the black matrix layers on the array substrate and a projection of the color resist layer on the array substrate do not overlap with each other, the black matrix layer array is provided with a plurality of through hole groups, and each of the through hole groups includes a plurality of through holes which are arranged correspondingly with respect to one another, and the plurality of through holes are correspondingly disposed in the plurality of black matrix layers;

The micro-lens array is disposed between the cover plate and the black matrix layer array. The micro-lens array includes a plurality of micro-lens units, and each of the micro-lens units corresponds to one of the through hole groups.

The detector array is disposed between the black matrix layer array and the array substrate. The detector array includes a plurality of detector units, and each of the detector units corresponds to one of the through hole groups.

In some embodiments, the micro-lens array is disposed on a surface of the substrate close to the array substrate.

In some embodiments, one of the black matrix layers and the color resist layer are arranged in a same layer.

In some embodiments, in addition to the one of the black matrix layers arranged in the same layer as the color resist layer, another black matrix layer is disposed between the micro-lens array and the color resist layer.

In some embodiments, the detector array is disposed on a surface of the array substrate close to the color filter substrate In some embodiments, the black matrix layer array includes two black matrix layers, the two black matrix layers are a first black matrix layer and a second black matrix layer, the second black matrix layer and the color resist layer are arranged in the same layer, and the liquid crystal display panel further includes a first planarization layer and a second planarization layer.

The first planarization layer is disposed on the surface of the substrate close to the array substrate and covers the micro-lens array, and the first black matrix layer is disposed on a surface of the first planarization layer close to the array substrate.

The second planarization layer is disposed on a surface of the first black matrix layer close to the array substrate, and the second black matrix layer and the color resist layer are disposed on a surface of the second planarization layer close to the array substrate.

In some embodiments, a thickness of the first planarization layer and a thickness of the second planarization layer range from 2 μm to 50 μm, and a distance between the second planarization layer and the detector array ranges from 3 μm to 15 μm.

In some embodiments, a diameter of any one of the through holes in the first black matrix layer ranges from 8 μm to 28 μm, and a diameter of any one of the through holes in the second black matrix layer ranges from 3 μm to 16 μm.

In some embodiments, the micro-lens units include a plurality of micro lenses, a diameter of any one of the micro lenses ranges from 3 μm to 30 μm, a height of any one of the micro lenses ranges from 2 μm to 10 μm, and a radius of curvature of any one of the micro lenses ranges from 5 μm to 15 μm.

In some embodiments, a shape of the detector units includes square or round, and a side length of a square detector unit or a diameter of a round detector unit both range from 5 μm to 18 μm.

In the liquid crystal display panel and the liquid crystal display device of the present disclosure, the micro-lens array, the black matrix layer array, and the detector array are sequentially disposed between the cover plate and the array substrate, and a combination of the micro-lens array and the black matrix layer array filters out more interference light, so that most of light entering the detector array is fingerprint reflected light, which improves an accuracy of fingerprint recognition.

DETAILED DESCRIPTION

In order to make purposes, technical solutions, and effects of the present disclosure clearer, the present disclosure will be further described in detail below with reference to the accompanying drawings and embodiments. It should be understood that the specific embodiments described herein are only used to explain the present disclosure, and are not used to limit the present disclosure.

Figure 1:
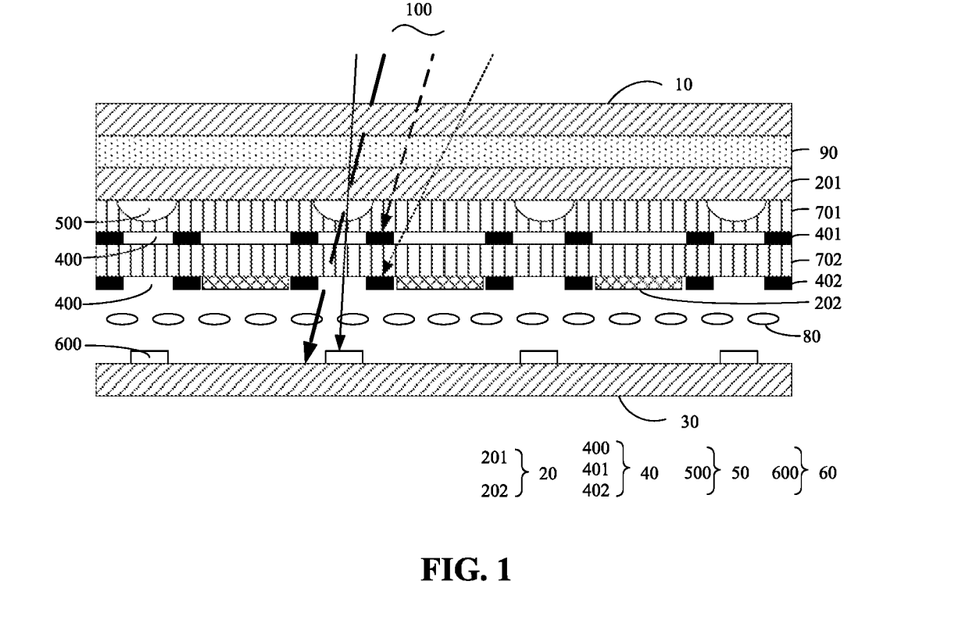
FIG. 1 is a schematic diagram of a film layer of a liquid crystal display panel of an embodiment of the present disclosure.

Please refer to FIG. 1, an embodiment of the present disclosure provides a liquid crystal display panel 100. The liquid crystal display panel 100 includes a cover plate 10, a color filter substrate 20, and a thin film transistor array substrate 30 (for ease of description, it is simply referred to as an array substrate 30). The color filter substrate 20 and the array substrate 30 are arranged oppositely, a liquid crystal 80 is disposed between the color filter substrate 20 and the array substrate 30. The cover plate 10 is disposed over a side of the color filter substrate 20 away from the array substrate 30. A polarizer 90 is disposed between the cover plate 10 and the color filter substrate 20. The color filter substrate 20 includes a substrate 201 and a color resist layer 202, and the color resist layer 202 is disposed over a side of the substrate 201 close to the array substrate 30.

The liquid crystal display panel 100 also includes a black matrix layer array 40, a micro-lens array 50, and a detector array 60.

The black matrix layer array 40 is disposed between the cover plate 10 and the array substrate 30, and the black matrix layer array 40 includes a plurality of black matrix layers which are disposed one above another. It should be noted that the black matrix layer array 40 shown in FIG. 1 includes two black matrix layers. For ease of description, one black matrix layer close to the cover plate 10 is called a first black matrix layer 401, and the other black matrix layer close to the array substrate 30 is called a second black matrix layer 402. In other embodiments, the number of black matrix layers may also be one, three, or more than three, which is not limited here.

A projection of each of the black matrix layers on the array substrate 30 and a projection of the color resist layer 202 on the array substrate 30 do not overlap with each other. That is, both the first black matrix layer 401 and the second black matrix layer 402 do not block the color resist layer 202, and light emitted by a light source through the color resist layer 202 can be normally emitted from the liquid crystal display panel 100, ensuring a display performance of the liquid crystal display panel 100.

The black matrix layer array 40 is provided with a plurality of through hole groups, and each of the through hole groups includes a plurality of through holes 400 which are arranged correspondingly with respect to one another, and the plurality of through holes 400 are correspondingly disposed in the plurality of black matrix layers. It should be noted that the corresponding arrangement of the plurality of through holes 400 means that center points of projections of the plurality of through holes 400 on the array substrate 30 coincide or approximately coincide. There are four through hole groups in the black matrix layer array 40 in FIG. 1, and each through hole group includes two through holes 400 which are arranged correspondingly with respect to one another. One of the through holes 400 is disposed in the first black matrix layer 401, and the other through hole 400 is disposed in the second black matrix layer 402.

The micro-lens array 50 is disposed between the cover plate 10 and the black matrix layer array 40. The micro-lens array 50 includes a plurality of micro-lens units 500, and each of the micro-lens units 500 corresponds to one of the through hole groups. That is, a center point of a projection of one of the micro-lens units 500 of the micro-lens array 50 on the array substrate 30 and a center point of a projection of one of the through holes 400 of the corresponding through hole group on the array substrate 30 coincide or approximately coincide. The micro-lens array 50 in FIG. 1 includes four micro-lens units 500, and each micro-lens unit 500 corresponds to one of the four through hole groups.

The detector array 60 is disposed between the black matrix layer array 40 and the array substrate 30. The detector array 60 includes a plurality of detector units 600, and each detector unit 600 corresponds to one of the through hole groups. That is, a center point of a projection of one of the detector units 600 of the detector array 60 on the array substrate 30 and a center point of a projection of one of the through holes 400 of the corresponding through hole group on the array substrate 30 coincide or approximately coincide. The detector array 60 shown in FIG. 1 includes four detector units 600, and each detector unit 600 corresponds to one of the four through hole groups.

Figure 2:
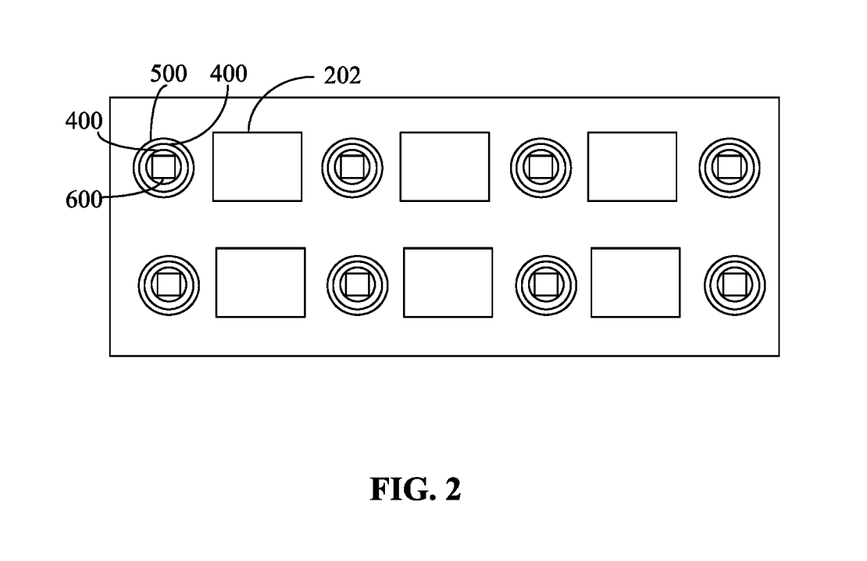
FIG. 2 is a top view of a partial film layer of the liquid crystal display panel shown in FIG. 1.

Preferably, please refer to FIG. 2, an area of a projection of any one of the micro-lens units 500 on the array substrate 30, an area of a projection of the through hole 400 of the first black matrix layer 401 of the through hole group corresponding to the micro-lens unit 500 on the array substrate 30, an area of a projection of the other through hole 400 of the second black matrix layer 402 of the corresponding through hole group on the array substrate 30, and an area of a projection of the detector units 600 corresponding to the through hole group on the array substrate 30 are decreasing (the latter is less than or equal to the former). The projection of the through hole 400 of the first black matrix layer 401 is within the projection of the micro-lens unit 500. The projection of the through hole 400 of the second black matrix layer 402 is within the projection of the through hole 400 of the first black matrix layer 401. The projection of the detector unit 600 is within the projection of the through hole 400 of the second black matrix layer 402.

A fingerprint recognition process of the liquid crystal display panel 100 is as follows.

The light source irradiates an area where a fingerprint of a finger is located through the liquid crystal display panel 100, and light is reflected by the finger to form a reflected light (for ease of description, it is referred to as a fingerprint reflected light). The fingerprint reflected light is converged to a receiving surface of the detector units 600 through the micro-lens units 500, and then the fingerprint reflected light is recognized by the detector units 600.

The micro-lens units 500 are configured to change a light path of the fingerprint reflected light that is inclined relative to the receiving surface of the detector units 600 to optimize the path of the inclined light, so that it tends to be perpendicular to the receiving surface of the detector units 600. In this way, a reflected light and a refracted light are reduced, and a light conversion efficiency and a uniformity are improved.

The detector unit 600 has the receiving surface for receiving the aforementioned fingerprint reflected light and converting it into an electrical signal, and then forming an optical fingerprint pattern from the electrical signal to perform the fingerprint recognition based on the formed optical fingerprint pattern. It should be noted that, because the micro-lens units 500 can improve the light conversion efficiency and uniformity, the optical fingerprint pattern formed by the detector units 600 based on the received fingerprint reflected light is clearer, thereby improving the accuracy of the fingerprint recognition.

However, for the liquid crystal display panel 100 shown in FIG. 1, light can be incident on the micro-lens units 500 in a wide range of angles, and these lights include the fingerprint reflected light in a small angle range (the solid line with arrows shown in FIG. 1), and include light not reflected by the finger in a large angle range (for ease of description, it is referred to as interference light), for example, an interference light 1 shown in FIG. 1 (a thick dashed line with an arrow shown in FIG. 1), an interference light 2 (a thicker dashed line with an arrow shown in FIG. 1), and an interference light 3 (a thin dashed line with an arrow shown in FIG. 1). As can be seen from FIG. 1, the fingerprint reflected light sequentially passes through the micro-lens units 500 and the through holes 400, and then converges to the detector units 600. The interference light 1 passes through the micro-lens units 500 and the through holes 400, and then converges to other areas other than the detector units 600. Therefore, the micro-lens units 500 can filter out the interference light 1. After the interference light 2 passes through the micro-lens units 500, it is blocked by a non-through hole area of the first black matrix layer 401 and cannot reach the detector units 600, so the first black matrix layer 401 can filter out the interference light 2. After the interference light 3 passes through the micro-lens units 500, it is blocked by a non-through hole area of the second black matrix layer 402 and cannot reach the detector units 600. Therefore, the second black matrix layer 402 can filter out the interference light 3. Understandably, if the number of black matrix layers is greater, a filtering effect of the interference light is better.

In the liquid crystal display panel 100 of the embodiment of the present disclosure, the micro-lens array 50, the black matrix layer array 40, and the detector array 60 are sequentially disposed between the cover plate 10 and the array substrate 30, and a combination of the micro-lens array 50 and the black matrix layer array 40 filters out more interference light, so that most of light entering the detector array 60 is the fingerprint reflected light, which improves an accuracy of the fingerprint recognition.

In some embodiments, referring to FIG. 1, the micro-lens array 50 is disposed on a surface of the substrate 201 close to the array substrate 30. In other embodiments, the micro-lens array 50 may also be disposed on a surface of the substrate 201 away from the array substrate 30.

In some embodiments, referring to FIG. 1, one of the black matrix layers is arranged on the same layer as the color resist layer 202. In addition to the one of the black matrix layers arranged in the same layer as the color resist layer, another black matrix layer is disposed between the micro-lens array 50 and the color resist layer 202. The black matrix layer array 40 shown in FIG. 1 includes two black matrix layers, namely the first black matrix layer 401 and the second black matrix layer 402. The second black matrix layer and the color resist layer 202 are arranged in the same layer, and the first black matrix layer is disposed between the micro-lens array 50 and the color resist layer 202. In other embodiments, the number of black matrix layers may also be one, three, or more than three, which is not limited here.

In some embodiments, referring to FIG. 1, the detector array 60 is disposed on a surface of the array substrate 30 close to the color filter substrate 20. For example, the detector array 60 may be disposed on a surface of a pixel electrode layer of the array substrate 20 and be driven individually. It should be noted that a film layer disposed on a side of the detector array 60 close to the color filter substrate 20 is a transparent film layer, so that the detector array 60 receives the fingerprint reflected light from the fingerprint on the liquid crystal display panel 100.

In some embodiments, referring to FIG. 1, the black matrix layer array 40 includes two black matrix layers, the two black matrix layers are the first black matrix layer 401 and the second black matrix layer 402. The second black matrix layer is arranged in the same as the color resist layer 202. The first black matrix layer is disposed between the micro-lens array 50 and the color resist layer 202. The liquid crystal display panel 100 also includes a first planarization layer 701 and a second planarization layer 702.

The first planarization layer 701 is disposed on the surface of the substrate 201 close to the array substrate 30 and covers the micro-lens array 50 for planarization and protection of the micro-lens array 50. The first black matrix layer 401 is disposed on a surface of the first planarization layer 701 close to the array substrate 30. It should be noted that material of the first planarization layer 701 can be an optically clear adhesive (OCA). The OCA has high light transmittance, high adhesion, and high water resistance. It is made into the first planarization layer 701, so it can be ensured that the fingerprint reflected light will not be lost or only very little loss when it passes through the first planarization layer 701, and it can also be ensured that the micro-lens array 50 will not move or peel off during long-term use.

The second planarization layer 702 is disposed on a surface of the first black matrix layer 401 close to the array substrate 30. The second black matrix layer 402 and the color resist layer 202 are disposed on a surface of the second planarization layer 702 close to the array substrate 30. It should be noted that the second planarization layer 702 may be made of the same material as the first planarization layer 701, which will not be repeated here.

Figure 3:
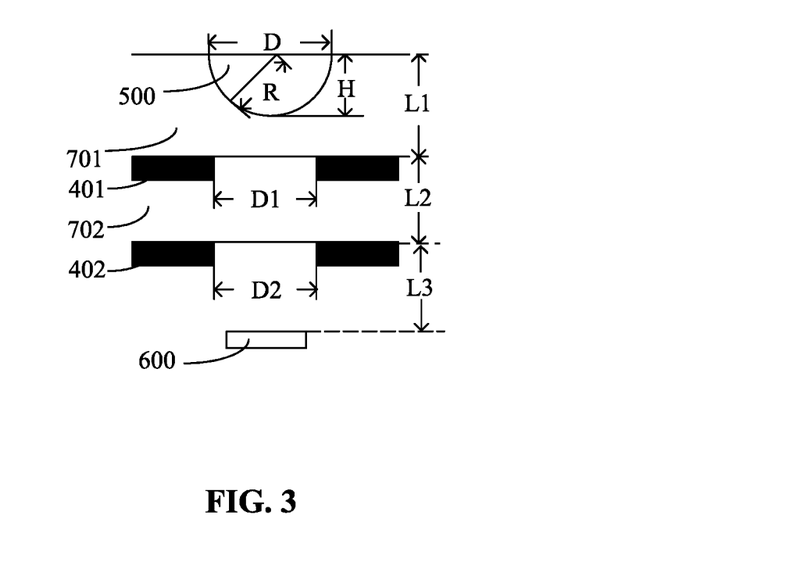
FIG. 3 is a schematic diagram of a partial size of the liquid crystal display panel shown in FIG. 1.

In some embodiments, referring to FIG. 3, a thickness L1 of the first planarization layer 701 and a thickness L2 of the second planarization layer 702 range from 2-50 μm, and a distance L3 between the second planarization layer 702 and the detector array 60 ranges from 3-15 μm.

In some embodiments, referring to FIG. 3, a diameter D1 of any one of the through holes 400 of the first black matrix layer 401 ranges from 8-28 μm, and a diameter D2 of any of the through holes 400 of the second black matrix layer 402 ranges from 3-16 μm.

In some embodiments, each of the micro-lens unit 500 includes a plurality of micro lenses, for example, one micro lens, or for example, n×n micro lenses arranged in n-row and n-column, where n is an integer greater than 1. Please refer to FIG. 3, the diameter D of any one of the micro lenses ranges from 3-30 μm, a height H of any one of the micro lenses ranges from 2-10 μm, and a radius of curvature R of any one of the micro lenses ranges from 5-15 μm.

In some embodiments, a shape of the detector units 600 is square or round, and a side length of a square detector unit and a diameter of a round detector unit range from 5 to 18 μm.

Figure 4:
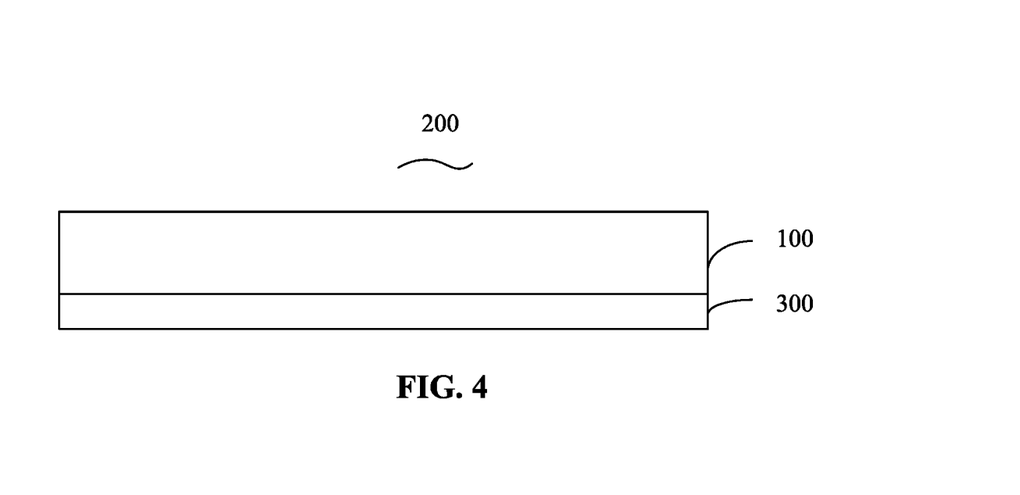
FIG. 4 is a schematic diagram of a liquid crystal display device of an embodiment of the present disclosure.

On the basis of any of the foregoing embodiments, the present disclosure also provides a liquid crystal display device. Please refer to FIG. 4, a liquid crystal display device 200 includes a liquid crystal display panel 100 and a backlight module 300. The backlight module 300 is configured to provide the liquid crystal display panel 100 with a uniform surface light source. Please refer to FIG. 1, the liquid crystal display panel 100 includes a cover plate 10, a color filter substrate 20, and a thin film transistor array substrate 30 (for ease of description, it is simply referred to as an array substrate 30). The color filter substrate 20 and the array substrate 30 are arranged oppositely, a liquid crystal 80 is disposed between the color filter substrate 20 and the array substrate 30. The cover plate 10 is disposed over a side of the color filter substrate 20 away from the array substrate 30. A polarizer 90 is disposed between the cover plate 10 and the color filter substrate 20. The color filter substrate 20 includes a substrate 201 and a color resist layer 202, and the color resist layer 202 is disposed over a side of the substrate 201 close to the array substrate 30.

The liquid crystal display panel 100 also includes a black matrix layer array 40, a micro-lens array 50, and a detector array 60.

The black matrix layer array 40 is disposed between the cover plate 10 and the array substrate 30, and the black matrix layer array 40 includes a plurality of black matrix layers which are disposed one above another. It should be noted that the black matrix layer array 40 shown in FIG. 1 includes two black matrix layers. For ease of description, one black matrix layer close to the cover plate 10 is called a first black matrix layer 401, and the other black matrix layer close to the array substrate 30 is called a second black matrix layer 402. In other embodiments, the number of black matrix layers may also be one, three, or more than three, which is not limited here.

A projection of each of the black matrix layers on the array substrate 30 and a projection of the color resist layer 202 on the array substrate 30 do not overlap with each other. That is, both the first black matrix layer 401 and the second black matrix layer 402 do not block the color resist layer 202, and light emitted by a light source through the color resist layer 202 can be normally emitted from the liquid crystal display panel 100, ensuring a display performance of the liquid crystal display panel 100.

The black matrix layer array 40 is provided with a plurality of through hole groups, and each of the through hole groups includes a plurality of through holes 400 which are arranged correspondingly with respect to one another, and the plurality of through holes 400 are correspondingly disposed in the plurality of black matrix layers. It should be noted that the corresponding arrangement of the plurality of through holes 400 means that center points of projections of the plurality of through holes 400 on the array substrate 30 coincide or approximately coincide. There are four through hole groups in the black matrix layer array 40 in FIG. 1, and each through hole group includes two through holes 400 which are arranged correspondingly with respect to one another. One of the through holes 400 is disposed in the first black matrix layer 401, and the other through hole 400 is disposed in the second black matrix layer 402.

The micro-lens array 50 is disposed between the cover plate 10 and the black matrix layer array 40. The micro-lens array 50 includes a plurality of micro-lens units 500, and each of the micro-lens units 500 corresponds to one of the through hole groups. That is, a center point of a projection of one of the micro-lens units 500 of the micro-lens array 50 on the array substrate 30 and a center point of a projection of one of the through holes 400 of the corresponding through hole group on the array substrate 30 coincide or approximately coincide. The micro-lens array 50 in FIG. 1 includes four micro-lens units 500, and each micro-lens unit 500 corresponds to one of the four through hole groups.

The detector array 60 is disposed between the black matrix layer array 40 and the array substrate 30. The detector array 60 includes a plurality of detector units 600, and each detector unit 600 corresponds to one of the through hole groups. That is, a center point of a projection of one of the detector units 600 of the detector array 60 on the array substrate 30 and a center point of a projection of one of the through holes 400 of the corresponding through hole group on the array substrate 30 coincide or approximately coincide. The detector array 60 shown in FIG. 1 includes four detector units 600, and each detector unit 600 corresponds to one of the four through hole groups.

Preferably, please refer to FIG. 2, an area of a projection of any one of the micro-lens units 500 on the array substrate 30, an area of a projection of the through hole 400 of the first black matrix layer 401 of the through hole group corresponding to the micro-lens unit 500 on the array substrate 30, an area of a projection of the other through hole 400 of the second black matrix layer 402 of the corresponding through hole group on the array substrate 30, and an area of a projection of the detector units 600 corresponding to the through hole group on the array substrate 30 are decreasing (the latter is less than or equal to the former). The projection of the through hole 400 of the first black matrix layer 401 is within the projection of the micro-lens unit 500. The projection of the through hole 400 of the second black matrix layer 402 is within the projection of the through hole 400 of the first black matrix layer 401. The projection of the detector unit 600 is within the projection of the through hole 400 of the second black matrix layer 402.

A fingerprint recognition process of the liquid crystal display panel 100 is as follows.

The light source irradiates an area where a fingerprint of a finger is located through the liquid crystal display panel 100, and light is reflected by the finger to form a reflected light (for ease of description, it is referred to as a fingerprint reflected light). The fingerprint reflected light is converged to a receiving surface of the detector units 600 through the micro-lens units 500, and then the fingerprint reflected light is recognized by the detector units 600.

The micro-lens units 500 are configured to change a light path of the fingerprint reflected light that is inclined relative to the receiving surface of the detector units 600 to optimize the path of the inclined light, so that it tends to be perpendicular to the receiving surface of the detector units 600. In this way, a reflected light and a refracted light are reduced, and a light conversion efficiency and a uniformity are improved.

The detector unit 600 has the receiving surface for receiving the aforementioned fingerprint reflected light and converting it into an electrical signal, and then forming an optical fingerprint pattern from the electrical signal to perform the fingerprint recognition based on the formed optical fingerprint pattern. It should be noted that, because the micro-lens units 500 can improve the light conversion efficiency and uniformity, the optical fingerprint pattern formed by the detector units 600 based on the received fingerprint reflected light is clearer, thereby improving the accuracy of the fingerprint recognition.

However, for the liquid crystal display panel 100 shown in FIG. 1, light can be incident on the micro-lens units 500 in a wide range of angles, and these lights include the fingerprint reflected light in a small angle range (the solid line with arrows shown in FIG. 1), and include light not reflected by the finger in a large angle range (for ease of description, it is referred to as interference light), for example, an interference light 1 shown in FIG. 1 (a thick dashed line with an arrow shown in FIG. 1), an interference light 2 (a thicker dashed line with an arrow shown in FIG. 1), and an interference light 3 (a thin dashed line with an arrow shown in FIG. 1). As can be seen from FIG. 1, the fingerprint reflected light sequentially passes through the micro-lens units 500 and the through holes 400, and then converges to the detector units 600. The interference light 1 passes through the micro-lens units 500 and the through holes 400, and then converges to other areas other than the detector units 600. Therefore, the micro-lens units 500 can filter out the interference light 1. After the interference light 2 passes through the micro-lens units 500, it is blocked by a non-through hole area of the first black matrix layer 401 and cannot reach the detector units 600, so the first black matrix layer 401 can filter out the interference light 2. After the interference light 3 passes through the micro-lens units 500, it is blocked by a non-through hole area of the second black matrix layer 402 and cannot reach the detector units 600. Therefore, the second black matrix layer 402 can filter out the interference light 3. Understandably, if the number of black matrix layers is greater, a filtering effect of the interference light is better.

In the liquid crystal display device 200 of the embodiment of the present disclosure, the micro-lens array 50, the black matrix layer array 40, and the detector array 60 are sequentially disposed between the cover plate 10 and the array substrate 30, and a combination of the micro-lens array 50 and the black matrix layer array 40 filters out more interference light, so that most of light entering the detector array 60 is the fingerprint reflected light, which improves an accuracy of the fingerprint recognition.

In some embodiments, referring to FIG. 1, the micro-lens array 50 is disposed on a surface of the substrate 201 close to the array substrate 30. In other embodiments, the micro-lens array 50 may also be disposed on a surface of the substrate 201 away from the array substrate 30.

In some embodiments, referring to FIG. 1, one of the black matrix layers is arranged on the same layer as the color resist layer 202. In addition to the one of the black matrix layers arranged in the same layer as the color resist layer, another black matrix layer is disposed between the micro-lens array 50 and the color resist layer 202. The black matrix layer array 40 shown in FIG. 1 includes two black matrix layers, namely the first black matrix layer 401 and the second black matrix layer 402. The second black matrix layer and the color resist layer 202 are arranged in the same layer, and the first black matrix layer is disposed between the micro-lens array 50 and the color resist layer 202. In other embodiments, the number of black matrix layers may also be one, three, or more than three, which is not limited here.

In some embodiments, referring to FIG. 1, the detector array 60 is disposed on a surface of the array substrate 30 close to the color filter substrate 20. For example, the detector array 60 may be disposed on a surface of a pixel electrode layer of the array substrate 20 and be driven individually. It should be noted that a film layer disposed on a side of the detector array 60 close to the color filter substrate 20 is a transparent film layer, so that the detector array 60 receives the fingerprint reflected light from the fingerprint on the liquid crystal display panel 100.

In some embodiments, referring to FIG. 1, the black matrix layer array 40 includes two black matrix layers, the two black matrix layers are the first black matrix layer 401 and the second black matrix layer 402. The second black matrix layer is arranged in the same as the color resist layer 202. The first black matrix layer is disposed between the micro-lens array 50 and the color resist layer 202. The liquid crystal display panel 100 also includes a first planarization layer 701 and a second planarization layer 702.

The first planarization layer 701 is disposed on the surface of the substrate 201 close to the array substrate 30 and covers the micro-lens array 50 for planarization and protection of the micro-lens array 50. The first black matrix layer 401 is disposed on a surface of the first planarization layer 701 close to the array substrate 30. It should be noted that material of the first planarization layer 701 can be an optically clear adhesive (OCA). The OCA has high light transmittance, high adhesion, and high water resistance. It is made into the first planarization layer 701, so it can be ensured that the fingerprint reflected light will not be lost or only very little loss when it passes through the first planarization layer 701, and it can also be ensured that the micro-lens array 50 will not move or peel off during long-term use.

The second planarization layer 702 is disposed on a surface of the first black matrix layer 401 close to the array substrate 30. The second black matrix layer 402 and the color resist layer 202 are disposed on a surface of the second planarization layer 702 close to the array substrate 30. It should be noted that the second planarization layer 702 may be made of the same material as the first planarization layer 701, which will not be repeated here.

In some embodiments, referring to FIG. 3, a thickness L1 of the first planarization layer 701 and a thickness L2 of the second planarization layer 702 range from 2-50 μm, and a distance L3 between the second planarization layer 702 and the detector array 60 ranges from 3-15 μm.

In some embodiments, referring to FIG. 3, a diameter D1 of any one of the through holes 400 of the first black matrix layer 401 ranges from 8-28 μm, and a diameter D2 of any of the through holes 400 of the second black matrix layer 402 ranges from 3-16 μm.

In some embodiments, each of the micro-lens unit 500 includes a plurality of micro lenses, for example, one micro lens, or for example, n×n micro lenses arranged in n-row and n-column, where n is an integer greater than 1. Please refer to FIG. 3, the diameter D of any one of the micro lenses ranges from 3-30 μm, a height H of any one of the micro lenses ranges from 2-10 μm, and a radius of curvature R of any one of the micro lenses ranges from 5-15 μm.

In some embodiments, a shape of the detector units 600 is square or round, and a side length of a square detector unit and a diameter of a round detector unit range from 5 to 18 μm.

It can be understood that for those of ordinary skill in the art, equivalent replacements or changes can be made according to the technical solutions of the present disclosure and its inventive concept, and all these changes or replacements shall fall within the scope of the appended claims of the present disclosure.

What is claimed is:

1. A liquid crystal display panel, comprising a color filter substrate, an array substrate opposite to the color filter substrate, and a cover plate disposed over a side of the color filter substrate away from the array substrate,
wherein the color filter substrate comprises a substrate and a color resist layer disposed over a side of the substrate close to the array substrate; and
wherein the liquid crystal display panel further comprises:
a black matrix layer array disposed between the cover plate and the array substrate, wherein the black matrix layer array comprises a plurality of black matrix layers which are disposed one above another, a projection of each of the black matrix layers on the array substrate and a projection of the color resist layer on the array substrate do not overlap with each other, the black matrix layer array is provided with a plurality of through hole groups, and each of the through hole groups comprises a plurality of through holes which are arranged correspondingly with respect to one another, and the plurality of through holes are correspondingly disposed in the plurality of black matrix layers;
a micro-lens array disposed between the cover plate and the black matrix layer array, wherein the micro-lens array comprises a plurality of micro-lens units, and each of the micro-lens units corresponds to one of the through hole groups, each of the micro-lens units comprises a convex curved surface protruding toward a direction adjacent to the black matrix layer array; and
a detector array disposed between the black matrix layer array and the array substrate, wherein the detector array comprises a plurality of detector units, and each of the detector units corresponds to one of the through hole groups, and the convex curved surface protrudes toward a direction adjacent to the detector array.

2. The liquid crystal display panel as claimed in claim 1, wherein the micro-lens array is disposed on a surface of the substrate close to the array substrate.

3. The liquid crystal display panel as claimed in claim 2, wherein one of the black matrix layers and the color resist layer are arranged in a same layer.

4. The liquid crystal display panel as claimed in claim 3, wherein in addition to the one of the black matrix layers arranged in the same layer as the color resist layer, another black matrix layer is disposed between the micro-lens array and the color resist layer.

5. The liquid crystal display panel as claimed in claim 4, wherein the detector array is disposed on a surface of the array substrate adjacent to the color filter substrate.

6. The liquid crystal display panel as claimed in claim 1, wherein the black matrix layer array comprises two black matrix layers, the two black matrix layers are a first black matrix layer and a second black matrix layer, the second black matrix layer and the color resist layer are arranged in the same layer, the first black matrix layer is disposed on a side of the second black matrix layer away from the array substrate, and an area of a projection of a through hole defined in the first black matrix layer on the array substrate is greater than an area of a projection of a through hole defined in the second black matrix layer on the array substrate; and the liquid crystal display panel further comprises a first planarization layer and a second planarization layer;
the first planarization layer is disposed on the surface of the substrate close to the array substrate and covers the micro-lens array, and the first black matrix layer is disposed on a surface of the first planarization layer close to the array substrate; and the second planarization layer is disposed on a surface of the first black matrix layer close to the array substrate, and the second black matrix layer and the color resist layer are disposed on a surface of the second planarization layer close to the array substrate.

7. The liquid crystal display panel as claimed in claim 6, wherein a thickness of the first planarization layer and a thickness of the second planarization layer range from 2 μm to 50 μm, and materials of the first planarization layer and the second planarization layer comprises an optical clear adhesive; and a distance between the second planarization layer and the detector array ranges from 3 μm to 15 μm.

8. The liquid crystal display panel as claimed in claim 6, wherein a diameter of any one of the through holes in the first black matrix layer ranges from 8 μm to 28 μm, and a diameter of any one of the through holes in the second black matrix layer ranges from 3 μm to 16 μm.

9. The liquid crystal display panel as claimed in claim 6, wherein the micro-lens units comprise a plurality of micro lenses, a diameter of any one of the micro lenses ranges from 3 μm to 30 μm, a height of any one of the micro lenses ranges from 2 μm to 10 μm, and a radius of curvature of any one of the micro lenses ranges from 5 μm to 15 μm.

10. The liquid crystal display panel as claimed in claim 6, wherein a shape of the detector units comprises square or round, and a side length of a square detector unit or a diameter of a round detector unit both range from 5 μm to 18 μm.

11. A liquid crystal display device, comprising a liquid crystal display panel, wherein the liquid crystal display panel comprises a color filter substrate, an array substrate opposite to the color filter substrate, and a cover plate disposed over a side of the color filter substrate away from the array substrate, wherein the color filter substrate comprises a substrate and a color resist layer disposed over a side of the substrate close to the array substrate; and wherein the liquid crystal display panel further comprises:

a black matrix layer array disposed between the cover plate and the array substrate, wherein the black matrix layer array comprises a plurality of black matrix layers which are disposed one above another, a projection of each of the black matrix layers on the array substrate and a projection of the color resist layer on the array substrate do not overlap with each other, the black matrix layer array is provided with a plurality of through hole groups, and each of the through hole groups comprises a plurality of through holes which are arranged correspondingly with respect to one another, and the plurality of through holes are correspondingly disposed in the plurality of black matrix layers;

a micro-lens array disposed between the cover plate and the black matrix layer array, wherein the micro-lens array comprises a plurality of micro-lens units, and each of the micro-lens units corresponds to one of the through hole groups, each of the micro-lens units comprises a convex curved surface protruding toward a direction adjacent to the black matrix layer array; and a detector array disposed between the black matrix layer array and the array substrate, wherein the detector array comprises a plurality of detector units, and each of the detector units corresponds to one of the through hole groups, and the convex curved surface protrudes toward a direction adjacent to the detector array.

12. The liquid crystal display device as claimed in claim 11, wherein the micro-lens array is disposed on a surface of the substrate close to the array substrate.

13. The liquid crystal display device as claimed in claim 12, wherein one of the black matrix layers and the color resist layer are arranged in a same layer.

14. The liquid crystal display device as claimed in claim 13, wherein in addition to the one of the black matrix layers arranged in the same layer as the color resist layer, another black matrix layer is disposed between the micro-lens array and the color resist layer.

15. The liquid crystal display device as claimed in claim 14, wherein the detector array is disposed on a surface of the array substrate adjacent to the color filter substrate.

16. The liquid crystal display device as claimed in claim 11, wherein the black matrix layer array comprises two black matrix layers, the two black matrix layers are a first black matrix layer and a second black matrix layer, the second black matrix layer and the color resist layer are arranged in the same layer, the first black matrix layer is disposed on a side of the second black matrix layer away from the array substrate, and an area of a projection of a through hole defined in the first black matrix layer on the array substrate is greater than an area of a projection of a through hole defined in the second black matrix layer on the array substrate; and the liquid crystal display panel further comprises a first planarization layer and a second planarization layer;

the first planarization layer is disposed on the surface of the substrate close to the array substrate and covers the micro-lens array, and the first black matrix layer is disposed on a surface of the first planarization layer close to the array substrate; and the second planarization layer is disposed on a surface of the first black matrix layer close to the array substrate, and the second black matrix layer and the color resist layer are disposed on a surface of the second planarization layer close to the array substrate.

17. The liquid crystal display device as claimed in claim 16, wherein a thickness of the first planarization layer and a thickness of the second planarization layer range from 2 μm to 50 μm, and materials of the first planarization layer and the second planarization layer comprises an optical clear adhesive; and a distance between the second planarization layer and the detector array ranges from 3 μm to 15 μm.

18. The liquid crystal display device as claimed in claim 16, wherein a diameter of any one of the through holes in the first black matrix layer ranges from 8 μm to 28 μm, and a diameter of any one of the through holes in the second black matrix layer ranges from 3 μm to 16 μm.

19. The liquid crystal display device as claimed in claim 16, wherein the micro-lens units comprise a plurality of micro lenses, a diameter of any one of the micro lenses ranges from 3 μm to 30 μm, a height of any one of the micro lenses ranges from 2 μm to 10 μm, and a radius of curvature of any one of the micro lenses ranges from 5 μm to 15 μm.

20. The liquid crystal display device as claimed in claim 16, wherein a shape of the detector units comprises square or round, and a side length of a square detector unit or a diameter of a round detector unit both range from 5 μm to 18 μm.

* * * * *